US012669899B2

(12) United States Patent
Zhong et al.

(10) Patent No.: US 12,669,899 B2
(45) Date of Patent: Jun. 30, 2026

(54) DISPLAY PANEL, DRIVE METHOD FOR A DISPLAY PANEL, AND DISPLAY DEVICE

(71) Applicants: Xiamen Tianma Optoelectronics Co., Ltd., Xiamen (CN); Xiamen Tianma Microelectronics Co., Ltd., Xiamen (CN)

(72) Inventors: Yuhao Zhong, Xiamen (CN); Xuhui Peng, Xiamen (CN); Haiying Xiao, Xiamen (CN); Jianlong Song, Xiamen (CN)

(73) Assignees: Xiamen Tianma Optoelectronics Co., Ltd., Xiamen (CN); Xiamen Tianma Microelectronics Co., Ltd., Xiamen (CN)

( * ) Notice: Subject to any disclaimer, the term of this patent is extended or adjusted under 35 U.S.C. 154(b) by 89 days.

(21) Appl. No.: 18/736,570

(22) Filed: Jun. 7, 2024

(65) Prior Publication Data

US 2024/0319824 A1 Sep. 26, 2024

(30) Foreign Application Priority Data

Jan. 19, 2024 (CN) .......................... 202410080314.0

(51) Int. Cl.
*G06F 3/041* (2006.01)

(52) U.S. Cl.
CPC ........ *G06F 3/04184* (2019.05); *G06F 3/0412* (2013.01); *G06F 3/04164* (2019.05)

(58) Field of Classification Search
None
See application file for complete search history.

(56) References Cited

U.S. PATENT DOCUMENTS

2020/0233514 A1* 7/2020 Liang .................. G06F 3/04166

FOREIGN PATENT DOCUMENTS

| CN | 107204164 A | 9/2017 |
| CN | 108628499 A | 10/2018 |
| CN | 105159490 B | 2/2019 |
| CN | 208737440 U | 4/2019 |
| CN | 110688030 A | 1/2020 |

(Continued)

OTHER PUBLICATIONS

Chinese Office Action mailed Oct. 9, 2025, issued in related Chinese Application No. 202410080314.0, 22 pages.

*Primary Examiner* — Brian M Butcher
(74) *Attorney, Agent, or Firm* — Wiersch Law Group

(57) ABSTRACT

A display panel, a drive method for a display panel, and a display device. The display panel includes: display subregions; touch subregions, where one touch subregion overlaps at least one display subregion; and control units, where one control unit is electrically connected to touch electrodes of at least one touch subregion. A drive cycle includes alternating display stages and touch stages. In the display stage, data voltages are written into the pixel electrodes in a corresponding display subregion, a portion of the control units operate to transmit a common voltage to touch electrodes in a portion of the touch subregions, and the touch subregion into which the common voltage is written overlaps the display subregion into which the data voltages are written. In the effective touch time period, none of the control units operate, and each touch electrode senses and transmits a touch signal to the touch signal line.

16 Claims, 15 Drawing Sheets

(56)    References Cited

FOREIGN PATENT DOCUMENTS

| CN | 110750170 | A | 2/2020 |
|----|-----------|---|--------|
| CN | 110764653 | B | 10/2020 |
| CN | 116741100 | A | 9/2023 |

* cited by examiner

DISPLAY PANEL, DRIVE METHOD FOR A DISPLAY PANEL, AND DISPLAY DEVICE

CROSS-REFERENCE TO RELATED APPLICATION

The present application claims priority to Chinese Patent Application No. 202410080314.0, filed on Jan. 19, 2024, the content of which is incorporated herein by reference in its entirety

TECHNICAL FIELD

The present disclosure relates to the technical of display technologies, in particular to a display panel, a drive method for a display panel, and a display device.

BACKGROUND

Touch electrodes in an in-cell touch display panel are usually further reused as common electrodes for display. The touch electrode is written with a common voltage in a display stage, and transmits a touch signal in a touch stage, to perform a display function and a touch function in a time division manner. However, this kind of structure is prone to problems of poor display such as pits and horizontal stripes.

SUMMARY

In view of this, embodiments of the present disclosure provide a display panel, a drive method for a display panel, and a display device, to reduce the power consumption of the panel and alleviate the phenomenon of horizontal stripes.

In one aspect, an embodiment of the present disclosure provides a display panel, A display panel, including:

a plurality of display subregions arranged along a first direction, where each display subregion includes a plurality of pixel electrodes;

at least two touch subregions arranged along the first direction, where one touch subregion overlaps at least one display subregion, each touch subregion includes a plurality of touch electrodes, each touch electrode is electrically connected to a touch signal line; and at least two control units, where one control unit is electrically connected to the touch electrodes in at least one touch subregion through connecting lines, and the control unit is configured to transmit a common voltage to the touch electrodes connected to the control unit during operation;

where a one-frame drive cycle of the display panel includes alternating display stages and touch stages, each touch stage includes an effective touch time period and a blank time period, and one display stage corresponds to one display subregion;

in the display stage, data voltages are written into the pixel electrodes in a corresponding display subregion, a portion of the control units operate to transmit the common voltage to the touch electrodes in a portion of the touch subregions, and the touch subregion into which the common voltage is written overlaps the display subregion into which the data voltages are written; and in the effective touch time period, none of the control units operate, and each of the touch electrodes senses a touch signal and transmits the touch signal to the touch signal line.

In another aspect, an embodiment of the present disclosure provides a drive method for a display panel, where the display panel includes:

a plurality of display subregions arranged along a first direction, where each display subregion includes a plurality of pixel electrodes;

at least two touch subregions arranged along the first direction, where one touch subregion overlaps at least one display subregion, each touch subregion includes a plurality of touch electrodes, and each touch electrode is electrically connected to a touch signal line; and at least two control units, where one control unit is electrically connected to the touch electrodes in at least one touch subregion through connecting lines, and the control unit is configured to transmit a common voltage to the touch electrodes connected to the control unit during operation;

where a one-frame drive cycle of the display panel includes alternating display stages and touch stages, each touch stage includes an effective touch time period and a blank time period, and one display stage corresponds to one display subregion;

the drive method includes:

in the display stage, writing data voltages into the pixel electrodes in a corresponding display subregion, and causing a portion of the control units to operate to transmit the common voltage to the touch electrodes in a portion of the touch subregions, wherein the touch subregion that receives the common voltage overlaps the display subregion into which the data voltages are written; and in the effective touch time period, causing none of the control units to operate, and sensing, by each of the touch electrodes, a touch signal and transmitting, by the each of the touch electrodes, the touch signal to the touch signal line.

In still another aspect, an embodiment of the present disclosure provides a display device, including the above-mentioned display panel.

One of the above-mentioned technical solutions has the following beneficial effects:

In the embodiments of the present disclosure, in the display stage, by individually controlling the operating state of a portion of the control units, it is possible to write the common voltage into only a portion of the touch electrodes. On the one hand, in each display stage, only a portion of the control units need to be controlled to be switched to the operating state, while other control units do not need to be switched to the operating state, so that the state switching frequency of an individual control unit is reduced, and the power consumption of the panel can be effectively reduced. On the other hand, when entering the display stage from the touch stage, only a portion of the touch electrodes are written with the common voltage, such that not only the waste of power consumption can be reduced, but also the coupling between the touch electrodes and the data lines can be weakened by the voltage jumps occurring in only a portion of the touch electrodes compared with the case where the voltage jumps occur in all the touch electrodes of an entire screen, which in turn reduces loads of the data lines. Not only the charging and discharging of the data lines are accelerated, but also the degree of the disturbance of the voltages on the touch electrodes by the voltage jumps on the data lines is alleviated when the touch electrodes are charged, enabling the voltages on the touch electrodes to be charged to a standard common voltage value more quickly to effectively alleviate the phenomenon of pits and horizontal stripes.

BRIEF DESCRIPTION OF DRAWINGS

To describe the technical solutions in the embodiments of the present disclosure more clearly, apparently, the drawings in the following description show merely some embodiments of the present disclosure, and a person of ordinary skill in the art may still derive other drawings from these drawings without creative efforts.

DESCRIPTION OF EMBODIMENTS

For a better understanding of the technical solutions of the present disclosure, the embodiments of the present disclosure are described in detail below in conjunction with the drawings.

It should be noted that the embodiments described are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" used herein merely describes associations between associated objects, and it indicates three types of relationships, for example, A and/or B may indicate that A exists alone, A and B coexist, or B exists alone. In addition, the character "/" herein generally indicates that the associated objects are in an "or" relationship.

At present, touch electrodes in an in-cell touch display panel are usually further reused as common electrodes for display. A touch electrode needs to be written with a common voltage in a display stage to implement a display function and to transmit a touch signal in a touch stage to implement a touch function.

Figures 1, 2:
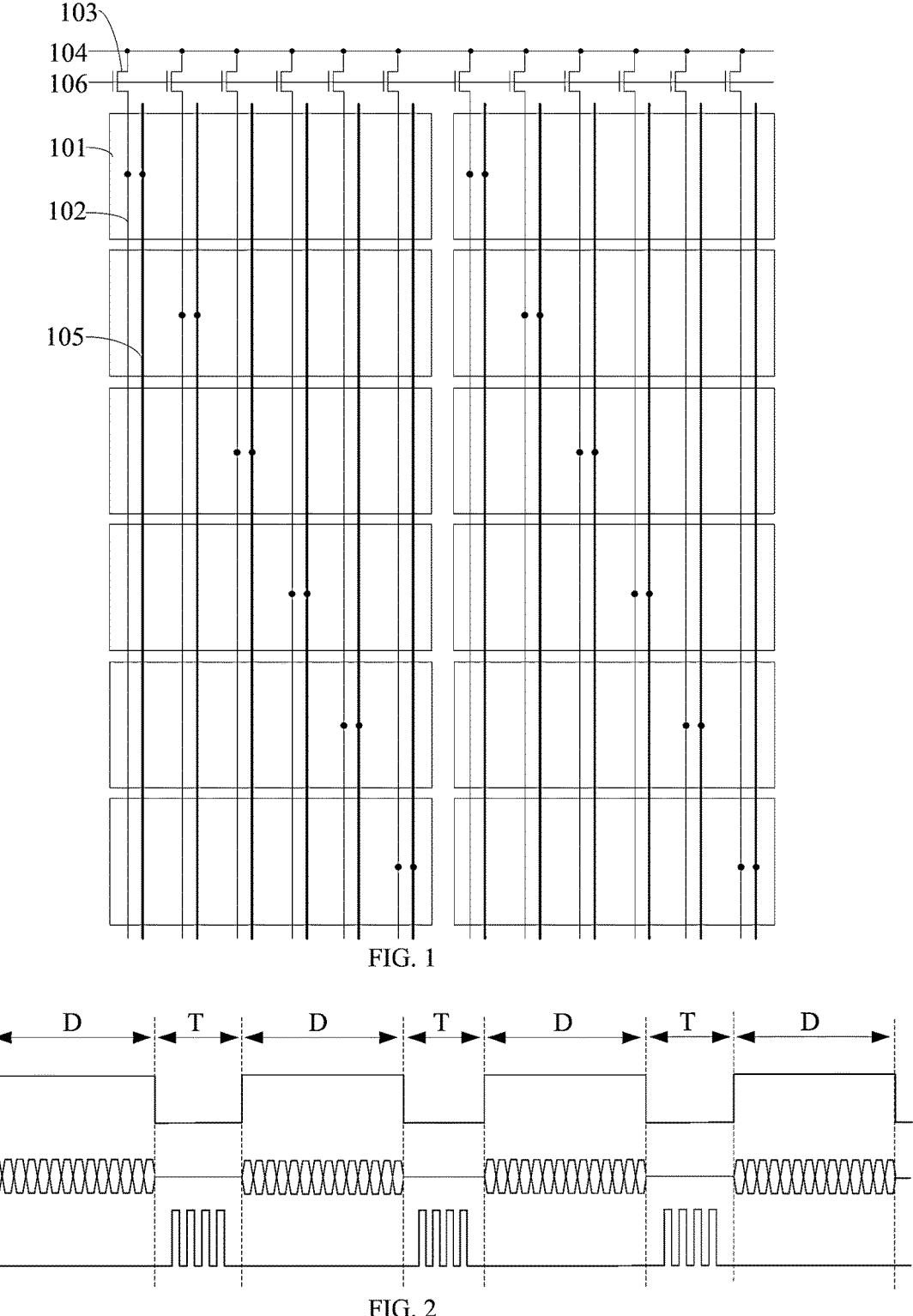
FIG. 1 is a schematic structural diagram of a display panel provided by an embodiment of the present disclosure.
FIG. 2 is a timing diagram corresponding to FIG. 1.

In this regard, an embodiment of the present disclosure provides a panel structure, as shown in FIG. 1, which is a schematic structural diagram of a display panel provided by the embodiment of the present disclosure. In this structure, the display panel includes a plurality of touch electrodes 101 arranged in a matrix. On the one hand, each touch electrode 101 is connected to a switch 103 through a connecting line 102 and then connected to a voltage signal line 104 through the switch 103 to form, by using the connecting line 102 and the switch 103, a path for transmitting a common voltage. On the other hand, each touch electrode 101 is further electrically connected to a touch signal line 105 to form, by using the touch signal line 105, a path for transmitting a touch signal.

As shown in FIG. 2, which is a timing diagram corresponding to FIG. 1, a one-frame drive cycle A of the display panel includes alternating display stages D and touch stages T.

In display stage D, a gate line scans a portion of pixel rows in sequence, data lines transmit data voltages (which are represented by Data in the drawing of the embodiment of the present disclosure) to pixel electrodes of the portion of the pixel rows, and a control signal line 106 controls all the switches 103 to be turned on, such that the common voltage provided by the voltage signal line 104 is transmitted to the touch electrodes 101 through the switches 103, thereby causing the pixel electrodes and the touch electrodes 101 overlapping the pixel electrodes to form electric fields to drive liquid crystal molecules to rotate.

In touch stage T, the scanning of the pixel rows is stopped, the data lines also stop transmitting the data voltages, and the control signal line 106 controls all the switches 103 to be turned off, such that the common voltage can no longer be transmitted to the touch electrodes 101. In this stage, each of the touch electrodes 101 senses a capacitance change and transmits a sensed touch signal to the touch signal line 105, thereby enabling a driver chip to judge a touch position according to the sensed touch signal to realize touch detection.

However, the inventors have found in the course of further research that in this structure, the states of all the switches 103 are uniformly controlled. In other words, when switching between the display stage D and the touch stage T, the states of all the switches 103 are also switched accordingly.

Because the display stage D and the touch stage T are frequently switched within a frame of time, the states of all the switches 103 may be caused to be frequently switched correspondingly, which in turn causes a high power consumption of a panel.

In addition, in the display stage D, all the switches 103 are turned on, such that the common voltage is written into all the touch electrodes 101 of an entire screen. However, only a portion of the pixel rows are enabled in an individual display stage D, which means that only the common voltage on the touch electrodes 101 corresponding to the portion of the pixel rows is effective for display, and the common voltage on other touch electrodes 101 does not have a substantial effect. Therefore, the common voltage being received by the other touch electrodes 101 may cause a waste of power consumption to a certain extent.

In addition, when switching from the touch stage T to the display stage D, all the switches 103 are turned on, such that the voltages of all the touch electrodes 101 of the entire screen jump. Such jumps of the voltages of all the touch electrodes 101 of the entire screen may aggravate coupling between the touch electrodes 101 and the data lines, increasing the loads of the data lines. In this way, not only the charging and discharging of the data lines themselves may be affected, but also the degree of the disturbance of the voltages on the touch electrodes 101 by the jumps of the voltages on the data lines may be aggravated when the touch electrodes 101 are charged, making voltage signals on the touch electrodes 101 slow to recover and difficult to reach a standard common voltage value quickly, which in turn causes the abnormal display of a portion of the pixel rows and results in the phenomenon of pits and horizontal stripes on the display panel.

Exemplarily, a one-frame drive cycle of the display panel includes an $i^{th}$ display stage $D_i$, an $(i+1)^{th}$ display stage $D_{i+1}$, and an $i^{th}$ touch stage $T_i$ between the $i^{th}$ display stage $D_i$ and the $(i+1)^{th}$ display stage $D_{i+1}$.

An $(x1)^{th}$ pixel row to an $(x2)^{th}$ pixel row are scanned in the $i^{th}$ display stage $D_i$. An $(x2+1)$th pixel row to an $(x3)^{th}$ pixel row are scanned in the $(i+1)^{th}$ display stage $D_{i-1}$. When the $i^{th}$ touch stage $T_i$ ends and the $(i+1)^{th}$ display stage $D_{i+1}$ starts, since the voltages on the touch electrodes 101 during charging are greatly disturbed, the voltages on the touch electrodes 101 deviate from the standard common voltage value when the $(x2+1)^{th}$ pixel row is enabled, causing the abnormal display of the $(x2+1)^{th}$ pixel row and thus forming horizontal stripes at that location.

Figure 3:
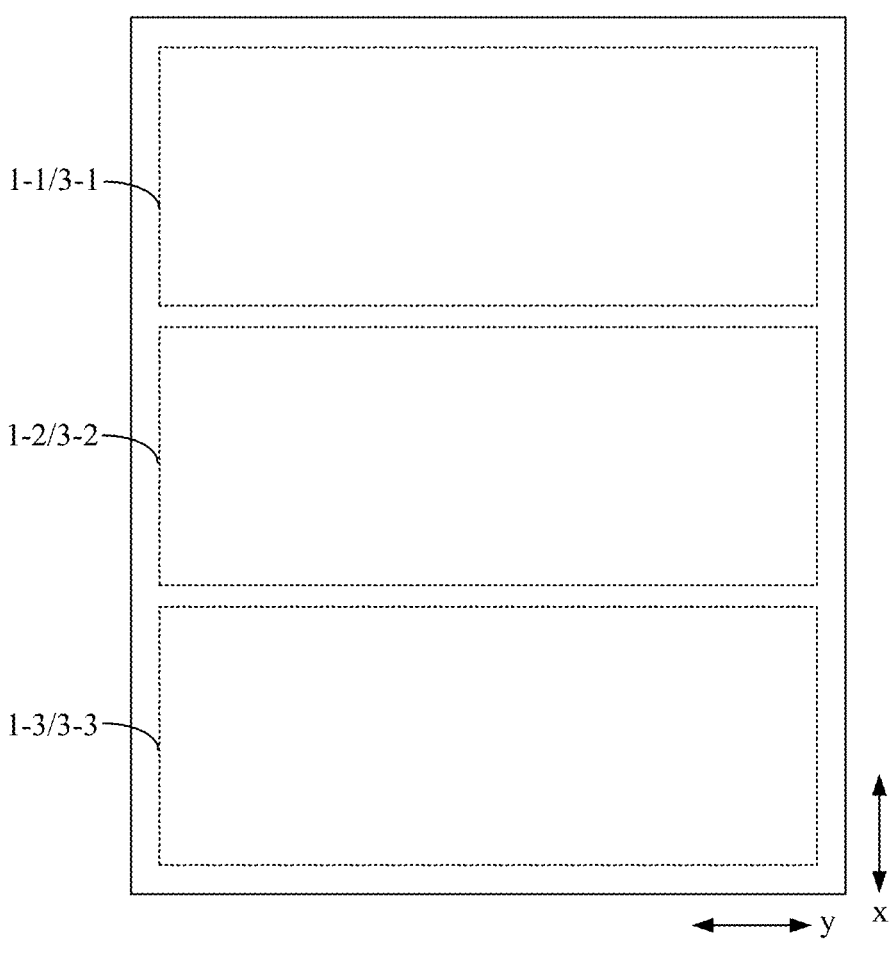
FIG. 3 is a schematic diagram of region division of a display panel provided by an embodiment of the present disclosure.
Figure 4:
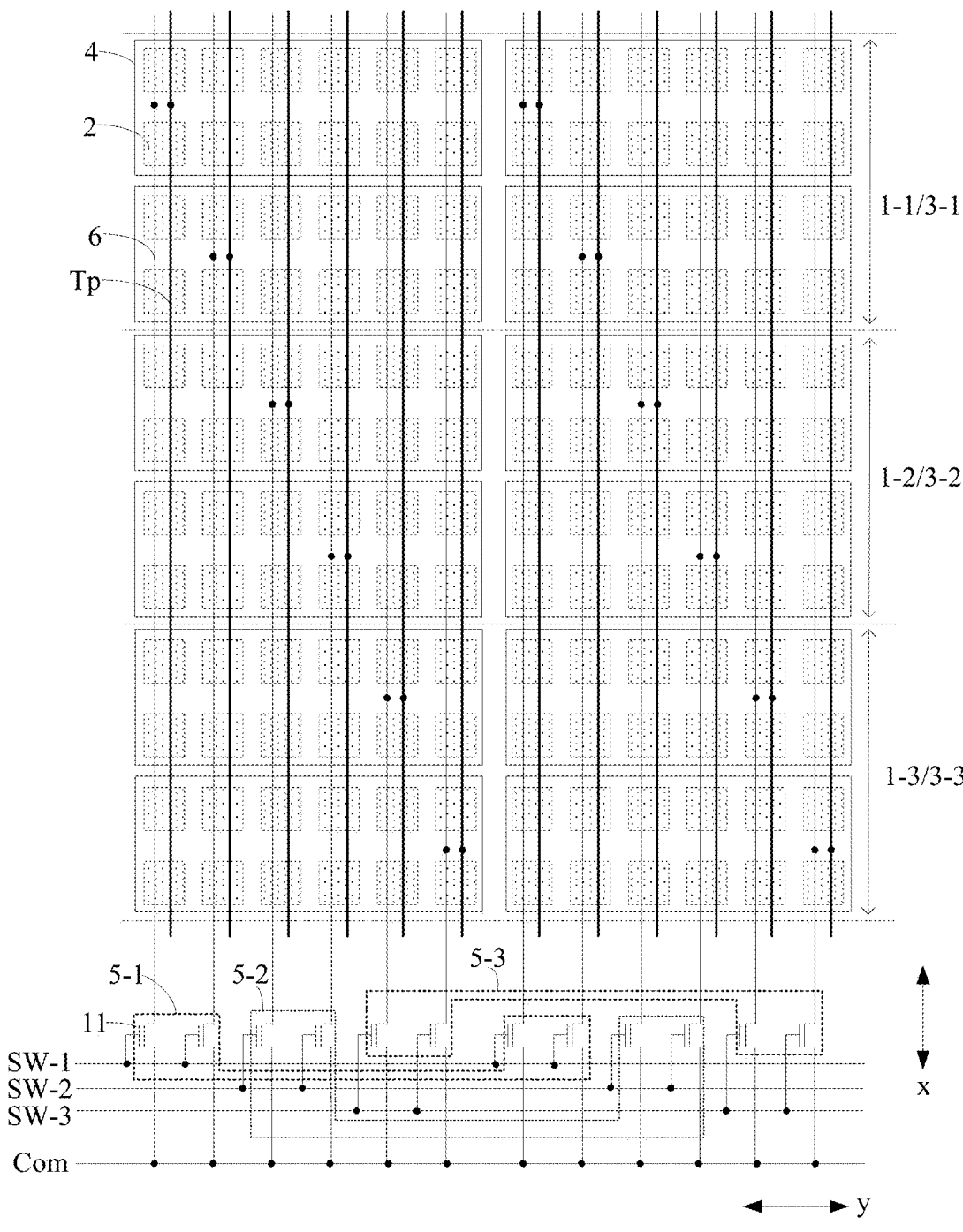
FIG. 4 is another schematic structural diagram of a display panel provided by an embodiment of the present disclosure.

In this regard, an embodiment of the present disclosure further provides a display panel, as shown in FIG. 3 and FIG. 4. FIG. 3 is a schematic diagram of region division of the display panel provided by the embodiment of the present disclosure, and FIG. 4 is another schematic structural diagram of the display panel provided by the embodiment of the present disclosure. The display panel includes a plurality of display subregions 1 arranged along a first direction x. The first direction x may be a direction of scanning the pixel rows in the display panel. Each display subregion 1 includes a plurality of pixel electrodes 2. Each pixel electrode 2 is electrically connected to a data line (not shown in the figure). Specifically, the display subregion 1 includes a plurality of pixel rows arranged along the first direction x. The pixel row includes a plurality of pixel electrodes 2 arranged along a second direction y. The second direction y intersects the first direction x.

The display panel further includes at least two touch subregions 3 arranged along the first direction x. Each touch subregion 3 includes a plurality of touch electrodes 4. Each touch electrode 4 is electrically connected to a touch signal line Tp, and one touch subregion 3 overlaps at least one display subregion 1. That is, in a direction perpendicular to a plane of the display panel, the touch electrodes 4 in one touch subregion 3 overlap the pixel electrodes 2 in at least one display subregion 1.

The display panel further includes at least two control units 5. One control unit 5 is electrically connected to the touch electrodes 4 in at least one touch subregion 3 through connecting lines 6. The control unit 5 is configured to transmit a common voltage to the touch electrodes 4 connected to the control unit 5 during operation.

In this embodiment of the present disclosure, a number of the touch subregions 3 may be greater than or equal to a number of the control units 5.

For example, in one arrangement, referring to FIG. 4, the number of the touch subregions 3 is equal to the number of the control units 5. In this case, the control units 5 are in a one-to-one correspondence with the touch subregions 3. In other words, one control unit 5 is electrically connected to the touch electrodes 4 in one touch subregion 3 through connecting lines 6.

Figures 5, 6:
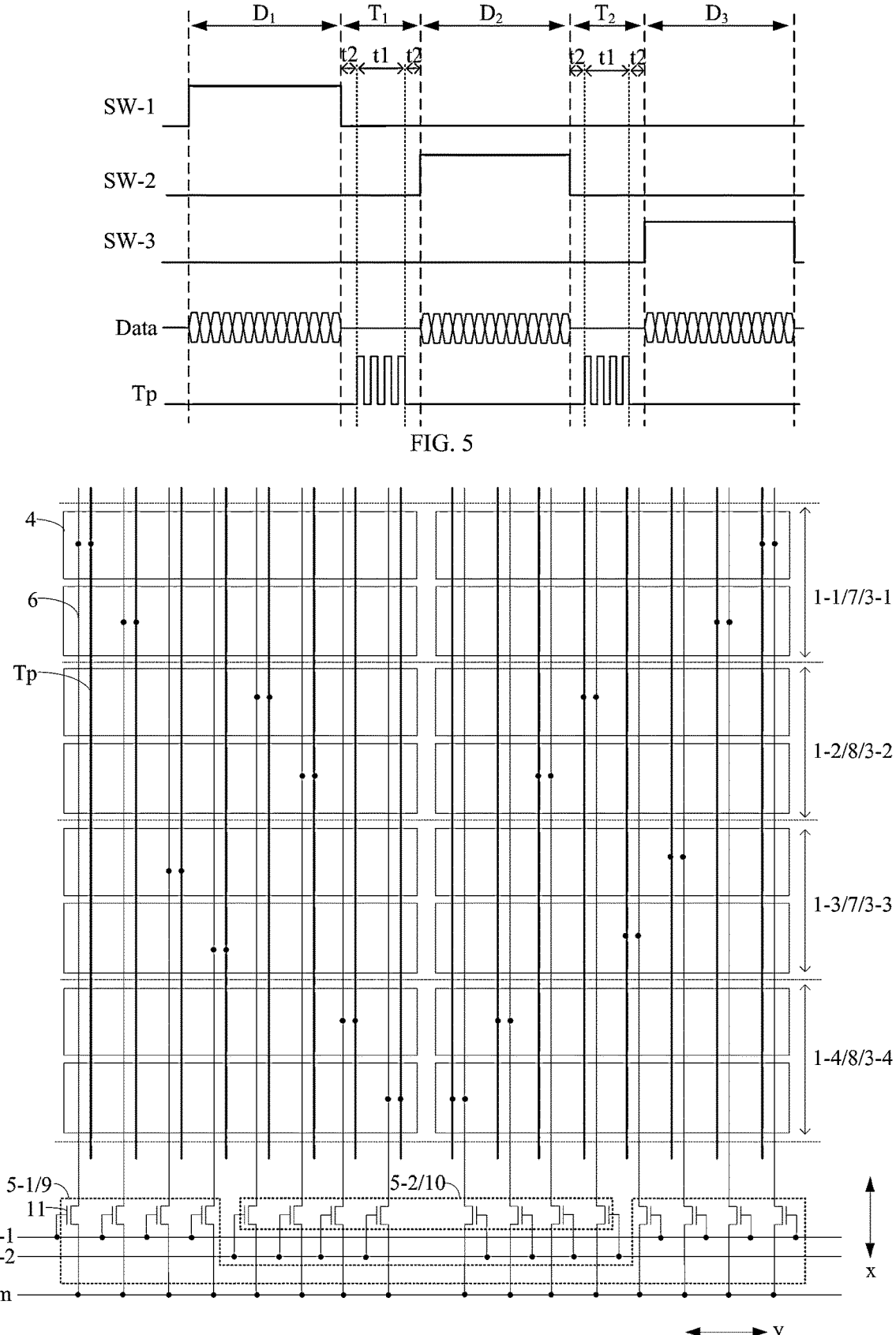
FIG. 5 is a timing diagram corresponding to FIG. 4.
FIG. 6 is still another schematic structural diagram of a display panel provided by an embodiment of the present disclosure.

Alternatively, in another arrangement, referring to FIG. 6, the number of the touch subregions 3 is greater than the number of the control units 5. In this case, at least a portion of the control units 5 need to correspond to two or more of the touch subregions 3. That is, it is possible that either each of the control units 5 is electrically connected to the touch electrodes 4 in at least two touch subregions 3, or it is possible that a portion of the control units 5 are electrically connected to the touch electrodes 4 in at least two touch subregions 3 and a portion of the control units 5 are electrically connected to the touch electrodes 4 in one touch subregion 3. Exemplarily, in FIG. 6, the number of the touch subregions 3 is twice the number of the control units 5. In this case, it is possible to make one control unit 5 electrically connected to the touch electrodes 4 in two of the touch subregions 3 through the connecting lines 6.

In conjunction with FIG. 5, which is a timing diagram corresponding to FIG. 4, a one-frame drive cycle of the display panel includes alternating display stages D and touch stages T. One display stage D corresponds to one display subregion 1. The touch stage T includes an effective touch time period t1 and a blank time period t2. The blank time period t2 may be understood as an interval between display stage D and the effective touch time period t1 and in the blank time period t2, the touch electrodes 4 do not perform touch sensing.

In the display stage D, data voltages (which are represented by Data in the drawing of the embodiment of the present disclosure) is written into the pixel electrodes 2 in the corresponding display subregion 1, a portion of the control units 5 operate to transmit a common voltage to the touch electrodes 4 in a portion of the touch subregions 3, and the touch subregions 3 that receive the common voltage overlap the display subregion 1 into which the data voltages are written.

In the effective touch time period t1, none of the control units 5 operate, and each of the touch electrodes 4 senses a touch signal and transmits the touch signal to the touch signal line Tp.

For clarity of illustration, in the drawings of the embodiment of the present disclosure, the plurality of display subregions 1 are respectively represented by reference numerals 1-1, 1-2, . . . , the at least two touch subregions 3 are respectively represented by reference numerals 3-1, 3-2, . . . , and the at least two control units 5 are respectively represented by reference numerals 5-1, 5-2, . . . . In addition, the plurality of display stages D are respectively represented by reference numerals D1, D2, . . . , and the plurality of touch stages T are respectively represented by T1, T2, . . . .

However, it should be noted that the number of the above-mentioned structures and stages illustrated in the drawings of the embodiments of the present disclosure are merely schematic, and is not a specific limitation of the number of the above-mentioned structure and stages.

Taking the structure shown in FIG. 4 as an example below, and in conjunction with FIG. 5, an operating process of the display panel is described:

In the display stage $D_1$, the pixel rows in the display subregion 1-1 are scanned in sequence. When the pixel rows are enabled, the data lines write data voltages into the pixel electrodes 2 in the pixel rows, and in this stage, the control unit 5-1 operates to control the touch electrodes 4 in the touch subregion 3-1 to receive a common voltage, which in turn causes the pixel electrodes 2 in the display subregion 1-1 to form electric fields with the touch electrodes 4 to drive liquid crystal molecules to rotate.

In the effective touch time period t1 of the touch stage T1, none of the control units 5 operate, and each the touch electrode 4 senses a touch signal and transmits the touch signal to the touch signal line Tp.

In the display stage $D_2$, the pixel rows in the display subregion 1-2 are scanned in sequence. When the pixel rows are enabled, the data lines write data voltages into the pixel electrodes 2 in the pixel rows, and in this stage, the control unit 5-2 operates to control the touch electrodes 4 in the touch subregion 3-2 to receive a common voltage, which in turn causes the pixel electrodes 2 in the display subregion 1-2 to form electric fields with the touch electrodes 4 to drive liquid crystal molecules to rotate.

In the effective touch time period t1 of the touch stage T2, none of the control units 5 operate, and the each touch electrode 4 senses a touch signal and transmits the touch signal to the touch signal line Tp.

In the display stage $D_3$, the pixel rows in the display subregion 1-3 are scanned in sequence. When the pixel rows are enabled, the data lines write data voltages into the pixel electrode 2 in the pixel row, and in this stage, the control unit 5-3 operates to control the touch electrodes 4 in the touch subregion 3-3 to receive a common voltage, which in turn causes the pixel electrodes 2 in the display subregion 1-3 to form electric fields with the touch electrodes 4 to drive liquid crystal molecules to rotate.

In combination with the above analysis, in the embodiment of the present disclosure, in the display stage D, by individually controlling the operating state of a portion of the control units 5, it is possible to write the common voltage into only a portion of the touch electrodes 4. On the one hand, in each display stage D, only a portion of the control units 5 need to be controlled to be switched to the operating state, while other control units 5 do not need to be switched to the operating state, so that the state switching frequency of an individual control unit 5 is reduced, and the power consumption of the panel can be effectively reduced. On the other hand, when entering the display stage D from the touch stage T, only a portion of the touch electrodes 4 are written with the common voltage, such that not only the waste of power consumption can be reduced, but also the coupling between the touch electrodes 4 and the data lines can be weakened by the voltage jumps occurring in only a portion of the touch electrodes 4 compared with the case where the voltage jumps occur in all the touch electrodes 4 of an entire screen, which in turn reduces loads of the data lines. Not only the charging and discharging of the data lines are accelerated, but also the degree of the disturbance of the voltages on the touch electrodes 4 by the voltage jumps on the data lines is alleviated when the touch electrodes 4 are charged, enabling the voltages on the touch electrodes 4 to be charged to a standard common voltage value more quickly to effectively alleviate the phenomenon of pits and horizontal stripes.

In a feasible implementation, referring to FIG. 3 to FIG. 5 again, the number of the touch subregions 3 may be set to be equal to that of the control units 5. In this case, one control unit 5 is electrically connected to the touch electrodes 4 in one touch subregion 3.

In this structure, the touch subregions 3 are in a one-to-one correspondence with the control units 5, and the control of the control units 5 over the touch subregions 3 is simpler and clearer. It can be understood that, in the display stage D, only one display subregion 1 displays, and one display subregion 1 overlaps one touch subregion 3, and thus in an individual display stage D, the touch electrodes 4 in only one touch subregion 3 need to have a substantial display effect. Where the touch subregions 3 are in a one-to-one correspondence with the control units 5, after entering the display stage D, only one control unit 5 needs to be selected to operate to control the common voltage to be written into the touch electrodes 4 in a specific touch subregion 3, which further reduces the waste of power consumption while ensuring normal display, and further reduces coupling between the touch electrodes 4 and the data lines, thereby enabling the charging and discharging of the data lines to be improved more greatly and the disturbance of the voltages on the touch electrodes 4 by the voltage jumps on the data lines to be alleviated more greatly.

Further, referring to FIG. 3 to FIG. 5 again, the number of the touch subregions 3 may also be set to be equal to that of the display subregions 1. In this case, one touch subregion 3 overlaps one display subregion 1. That is, in an individual display stage D, only the touch electrodes 4 corresponding to the pixel rows that need to be scanned receive the common voltage, and none of other touch electrodes 4 may receive the common voltage. Therefore, the power consumption of the panel is lower, and the coupling between the touch electrodes 4 and the data lines is smaller.

Certainly, in other implementations of the present disclosure, one touch subregion 3 may alternatively overlap at least two display subregions 1. The operating principle is similar to the above analysis, and is not described herein again.

Figure 7:
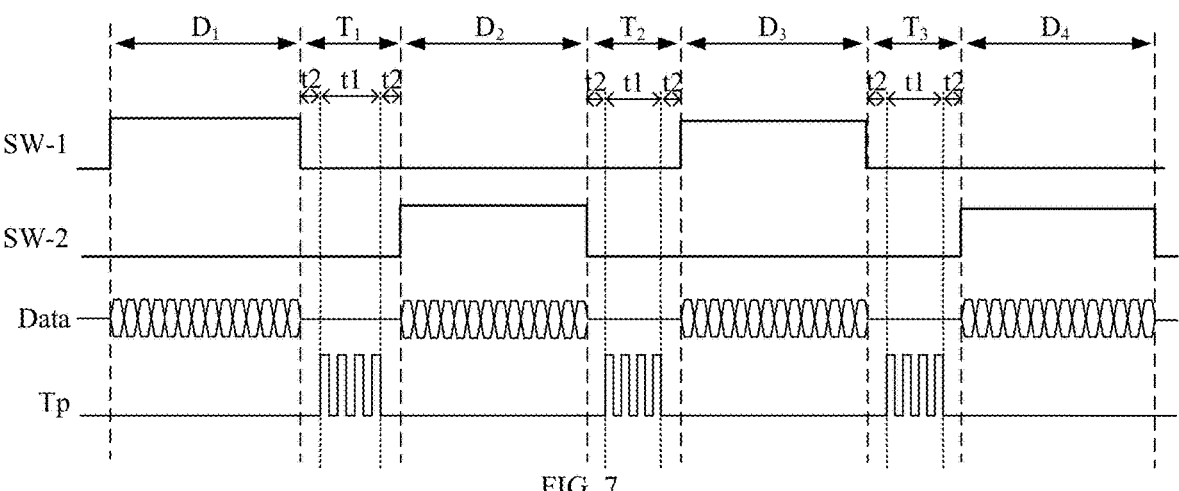
FIG. 7 is a timing diagram corresponding to FIG. 6.

In a feasible implementation, as shown in FIG. 6 and FIG. 7, FIG. 6 is still another schematic structural diagram of a display panel provided by an embodiment of the present disclosure, and FIG. 7 is a timing diagram corresponding to FIG. 6. The touch subregions 3 include a plurality of first touch subregions 7 and a plurality of second touch subregions 8. The first touch subregions 7 and the second touch subregions 8 are alternately arranged in a first direction x. In one arrangement, one first touch subregion 7 may overlap one display subregion 1, and one second touch subregion 8 may overlap one display subregion 1.

The control units 5 include a first control unit 9 and a second control unit 10. The first control unit 9 is electrically connected to the touch electrodes 4 in the plurality of first touch subregions 7. The second control unit 10 is electrically connected to the touch electrodes 4 in the plurality of second touch subregions 8.

Taking the structure illustrated in FIG. 6 as an example, in conjunction with FIG. 7:

In the display stage $D_1$, the first control unit 9 (the control unit 5-1) operates to control the common voltage to be written into the touch electrodes 4 in the plurality of first touch subregions 7 (the touch subregion 3-1 and the touch subregion 3-3). In this stage, the touch electrodes 4 in the touch subregion 3-1 form electric fields with the pixel electrodes 2 in the display subregion 1-1.

In the display stage $D_2$, the second control unit 10 (the control unit 5-2) operates to control the common voltage to be written into the touch electrodes 4 in the plurality of second touch subregions 8 (the touch subregion 3-2 and the touch subregion 3-4). In this stage, the touch electrodes 4 in the touch subregion 3-2 form electric fields with the pixel electrodes 2 in the display subregion 1-2.

In the display stage $D_3$, the first control unit 9 (the control unit 5-1) operates to control the common voltage to be written into the touch electrodes 4 in the plurality of first touch subregions 7 (the touch subregion 3-1 and the touch subregion 3-3). In this stage, the touch electrodes 4 in the touch subregion 3-3 form electric fields with the pixel electrodes 2 in the display subregion 1-3.

In the display stage $D_4$, the second control unit 10 (the control unit 5-2) operates to control the common voltage to be written into the touch electrodes 4 in the plurality of second touch subregions 8 (the touch subregion 3-2 and the touch subregion 3-4). In this stage, the touch electrodes 4 in the touch subregion 3-4 form electric fields with the pixel electrodes 2 in the display subregion 1-4.

This arrangement can reduce the number of the control units 5 that need to be provided in the display panel, and correspondingly reduce the number of the control signal lines SW connected to the control units 5 and used for controlling the operating states of the control units 5, which in turn can simplify the wiring design and reduce the space occupied by the control signal lines SW in a bezel.

The reduction in the number of the control signals line SW means that the control signal lines SW need to be connected to fewer ports. When the control signal lines SW are connected to ports in a driver chip or a timing controller, the specifications of the requirements for the driver chip or the timing controller can be reduced.

In a feasible implementation, referring to FIG. 4 and FIG. 6 again, the connecting lines 6 extend along the first direction x, and the control units 5 are located on at least one side of the connecting lines 6 in the first direction x.

In this structure, the control units 5 may be placed in an upper bezel and/or a lower bezel of the display panel. Since the widths of the upper bezel and lower bezel of the display panel are usually somewhat larger, a larger accommodation space can be provided for the control units 5. In addition, this kind of structure is more suitable for use in a display panel of a transversely elongated bar-shaped display device, such as that of a computer. Due to the smaller size of this kind of display panel in the first direction x, the connecting lines 6 extend with smaller lengths, which can effectively reduce a voltage drop of the common voltage during transmission.

Figure 8:
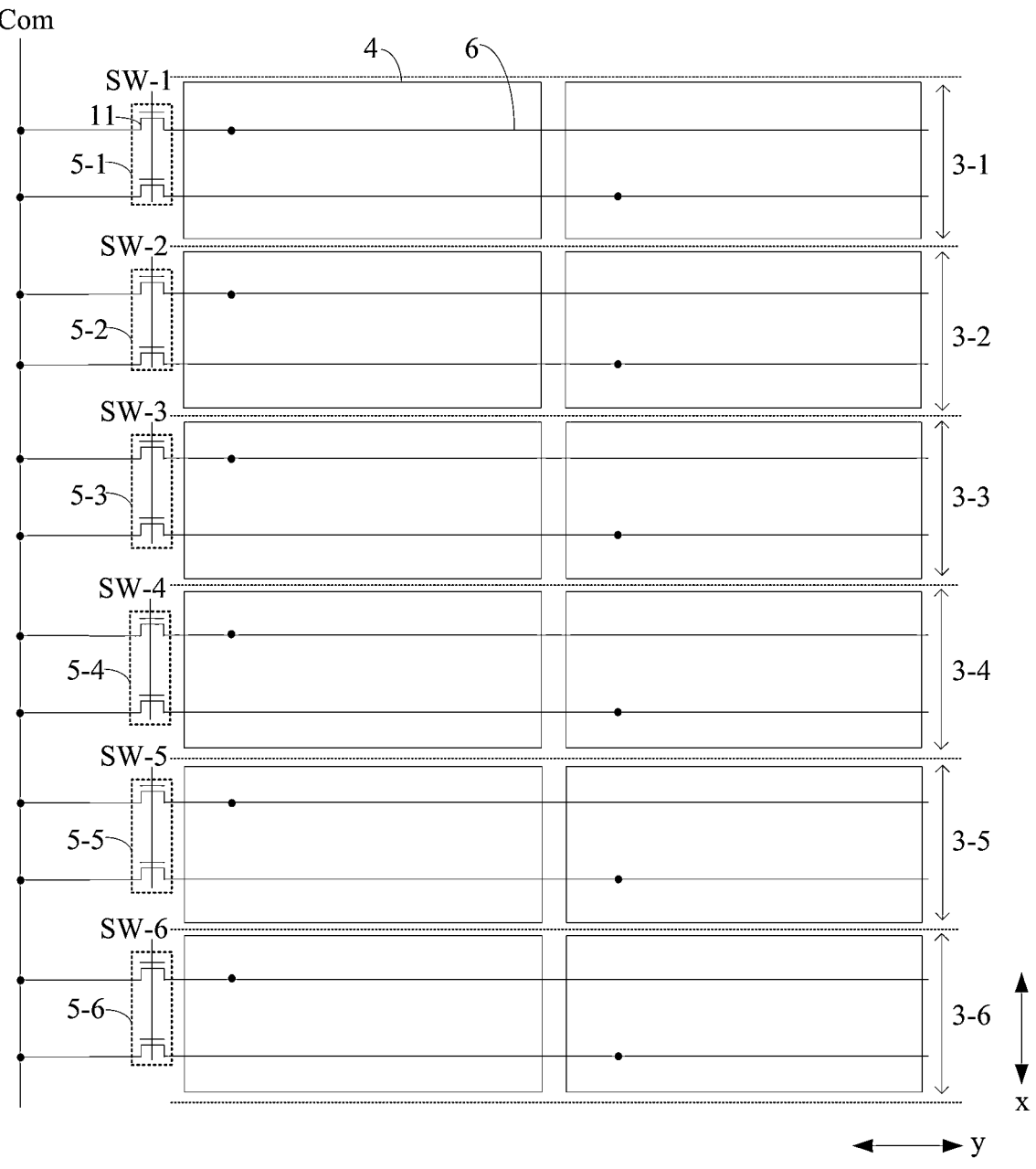
FIG. 8 is yet another schematic structural diagram of a display panel provided by an embodiment of the present disclosure.

Alternatively, in another feasible implementation, as shown in FIG. 8, which is yet another schematic structural diagram of a display panel provided by an embodiment of the present disclosure, the connecting lines 6 extend along the second direction y. The control units 5 are located on at least one side of the connecting lines 6 in the second direction y. The second direction y intersects the first direction x.

In this structure, the control units 5 may be placed in a left bezel and/or a right bezel of the display panel. In addition, this kind of structure is more suitable for use in a display panel of a vertically elongated bar-shaped display device, such as that of a mobile phone. Due to the smaller size of this kind of display panel in the second direction y, the connecting lines 6 extend with smaller lengths, which can effectively reduce a voltage drop of the common voltage during transmission.

Figure 9:
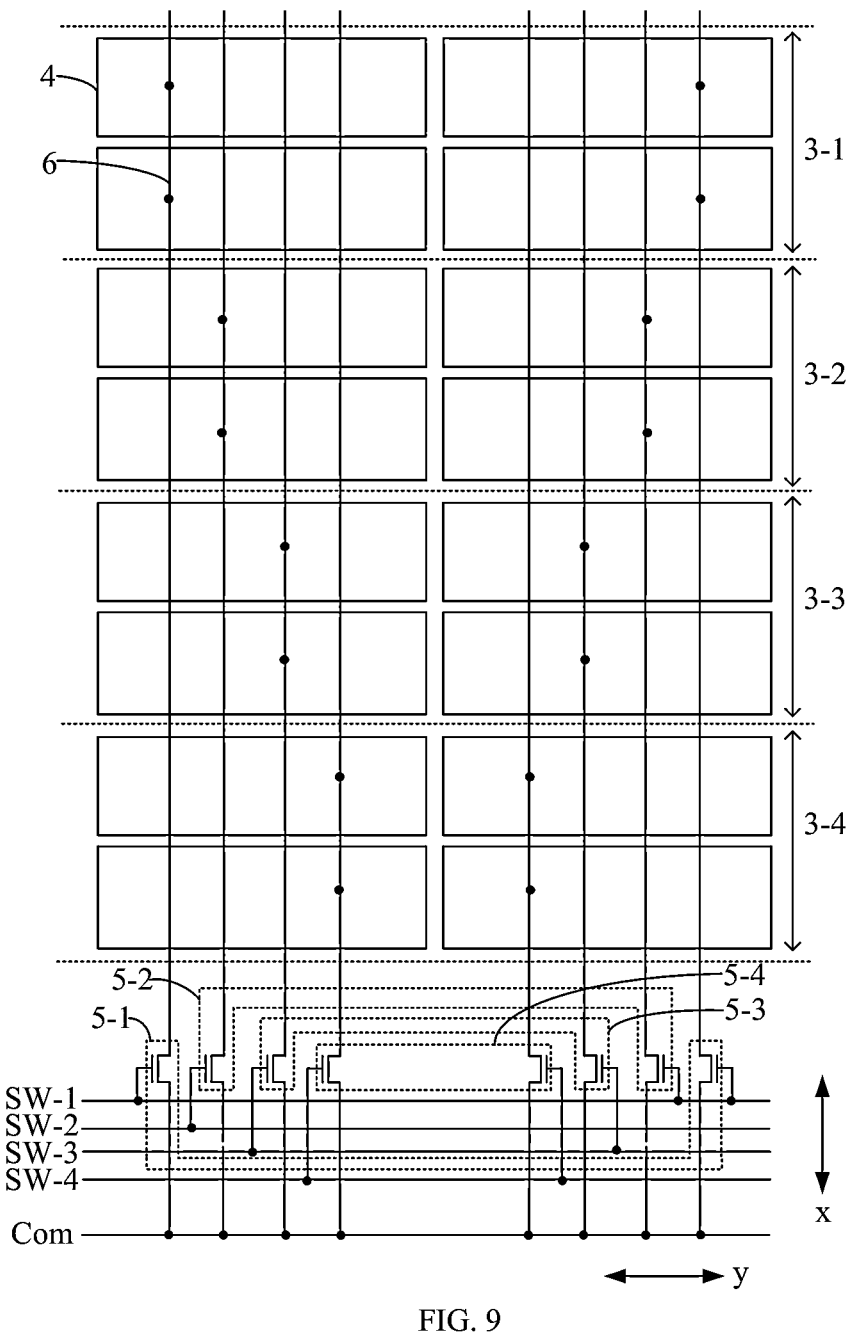
FIG. 9 is yet another schematic structural diagram of a display panel provided by an embodiment of the present disclosure.

In a feasible implementation, as shown in FIG. 9, which is yet another schematic structural diagram of a display panel provided by an embodiment of the present disclosure, in a same touch subregion 3, the touch electrodes 4 arranged in a direction in which the connecting lines 6 extend are electrically connected to one connecting line 6 to reduce the number of the switches that need to be provided in the control unit 5 and reduce manufacturing costs.

In a feasible implementation, referring to FIG. 4 and FIG. 6 again, the control unit 5 includes a plurality of first switches 11. The first switches 11 are electrically connected to the touch electrodes 4 through the connecting lines 6. In one structure, each first switch 11 may be of a transistor structure.

In the display stage D, the first switches 11 in a portion of the control units 5 are turned on in response to a control signal, to transmit the common voltage to the touch electrodes 4 connected to the first switches 11.

Figure 10:
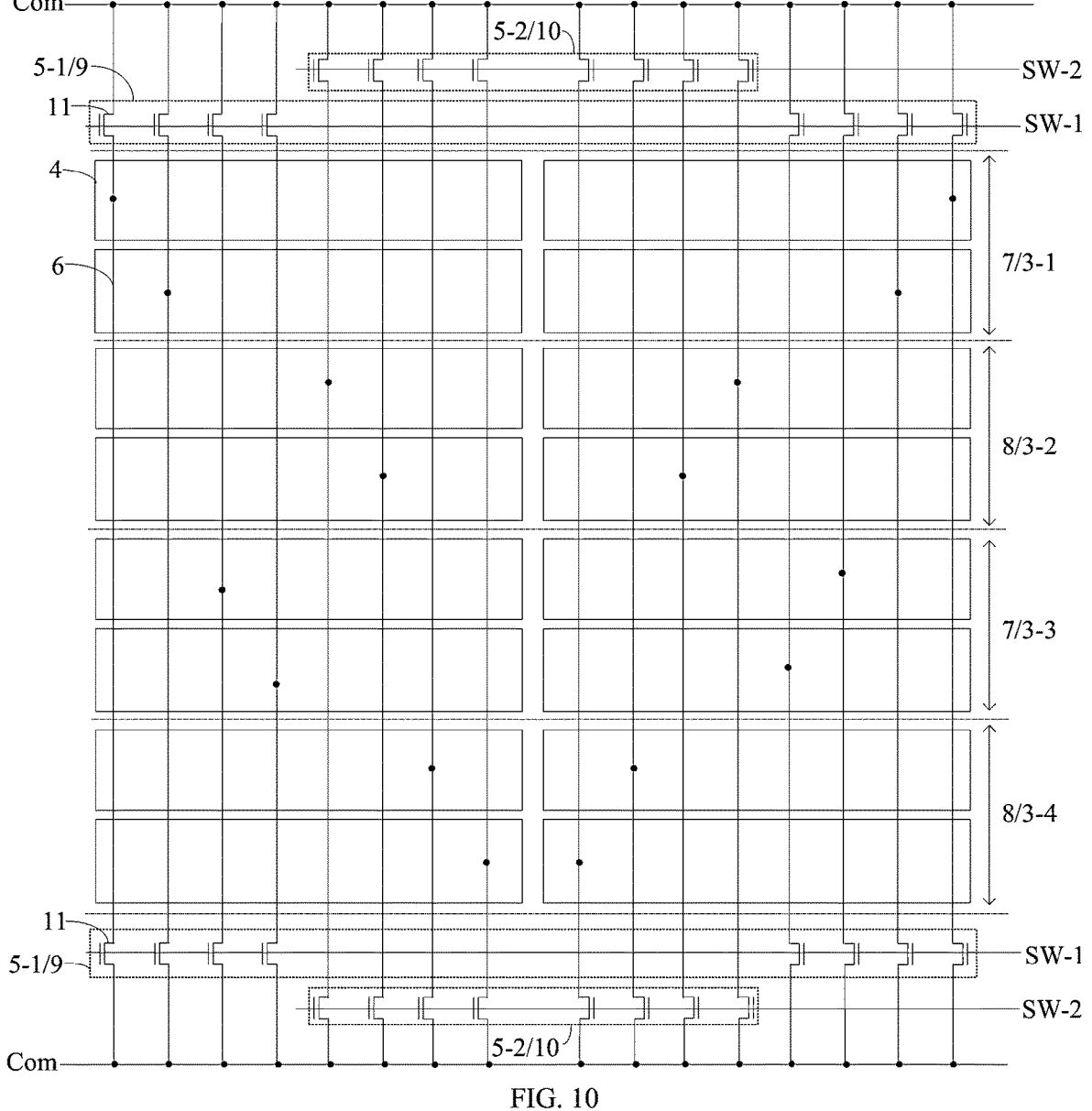
FIG. 10 is yet another schematic structural diagram of a display panel provided by an embodiment of the present disclosure.
Figure 11:
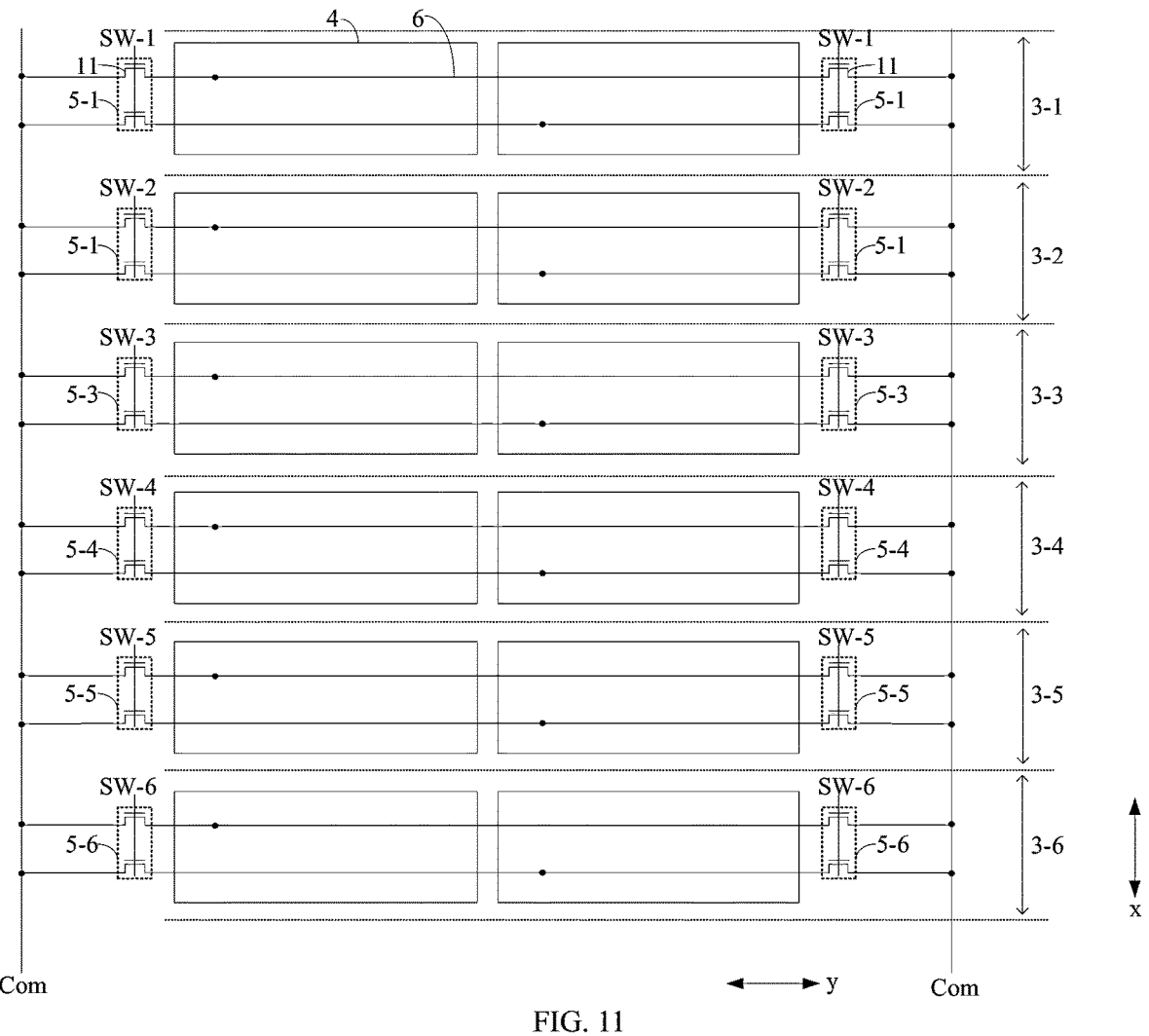
FIG. 11 is yet another schematic structural diagram of a display panel provided by an embodiment of the present disclosure.

In a feasible implementation, as shown in FIG. 10 and FIG. 11, FIG. 10 is yet another schematic structural diagram of a display panel provided by an embodiment of the present disclosure, and FIG. 11 is yet another schematic structural diagram of a display panel provided by an embodiment of the present disclosure. A first terminal and a second terminal of each connecting line 6 each are electrically connected to two first switches 11. In addition, the first switches 11 electrically connected to the same connecting line 6 receive a same control signal in the display stage D and receive a same control signal in the touch stage T.

In such an arrangement, when the first switches 11 at the two ends of the connecting wire 6 are turned on, the common voltage signal can be transmitted from the two ends of the connecting wire 6 to the touch electrode 4 at the same time. No matter the touch electrode 4 connected with the connecting wire 6 is closer to the upper bezel or the lower bezel of the display panel, or no matter the touch electrode 4 connected with the connecting wire 6 is closer to the left bezel or the right bezel of the display panel, the common voltage signal can be transmitted to the touch electrode 4 quickly, such that the touch electrode 4 can be charged in a timely manner.

In one arrangement, each first switch 11 has a control terminal electrically connected to a control signal line SW, and the first switches 11 in different control units 5 are electrically connected to different control signal lines SW. For clarity of illustration, in the above-mentioned drawings, a control signal line SW electrically connected to a control unit 5-$i$ is represented by a reference numeral SW-i. In addition, input terminals of all the first switches 11 may be electrically connected to a same voltage signal line Com. With this design, the number of the voltage signal lines Com is smaller and the wiring is simpler.

Before a display panel leaves a factory, a VT test may be performed on the display panel. During the VT test, the first switches 11 are controlled to be turned on, and a test common voltage is transmitted to the touch electrodes 4 through the voltage signal line Com, such that the display panel displays a test picture such as a solid color.

Figure 12:
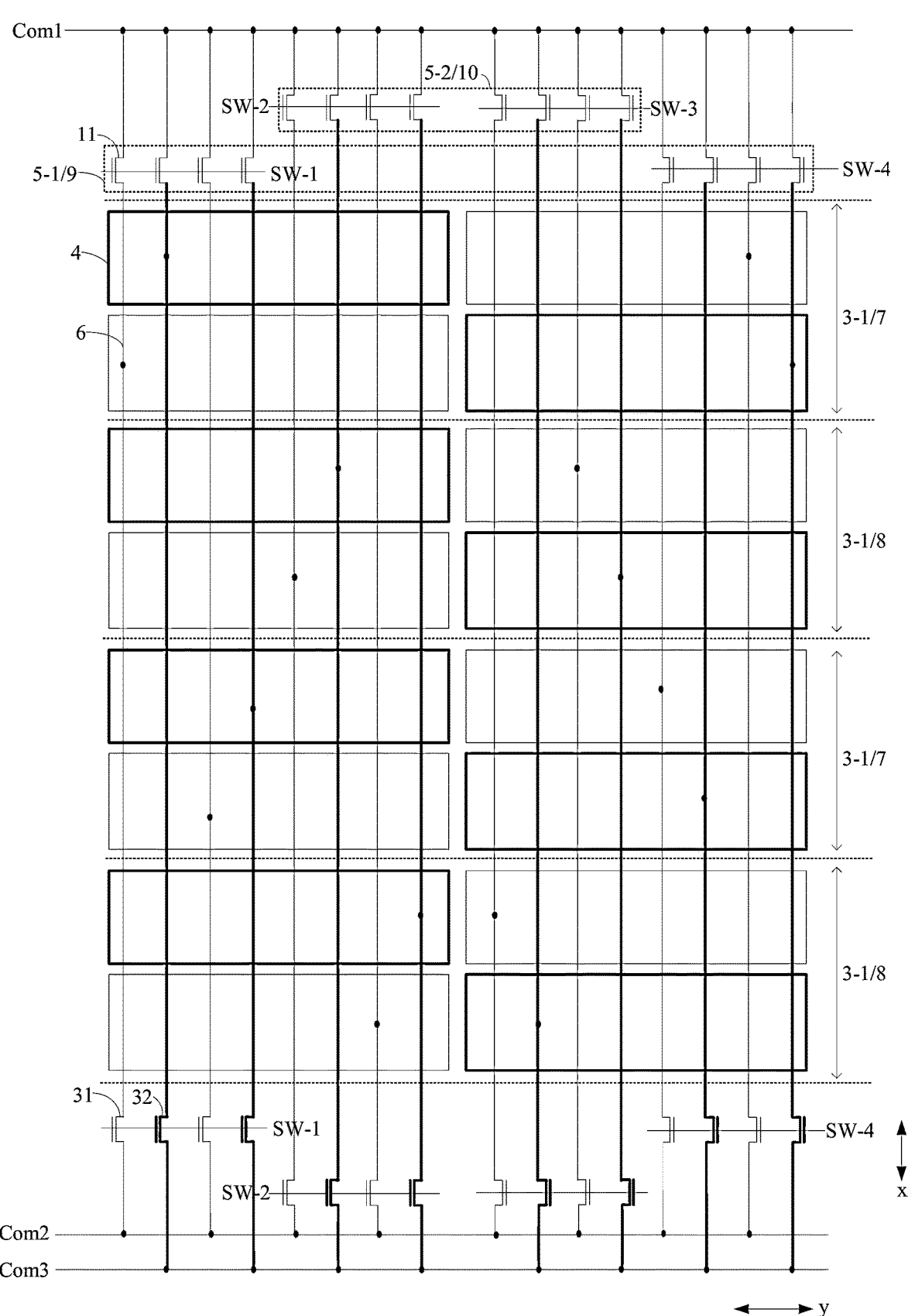
FIG. 12 is yet another schematic structural diagram of a display panel provided by an embodiment of the present disclosure.
Figure 13:
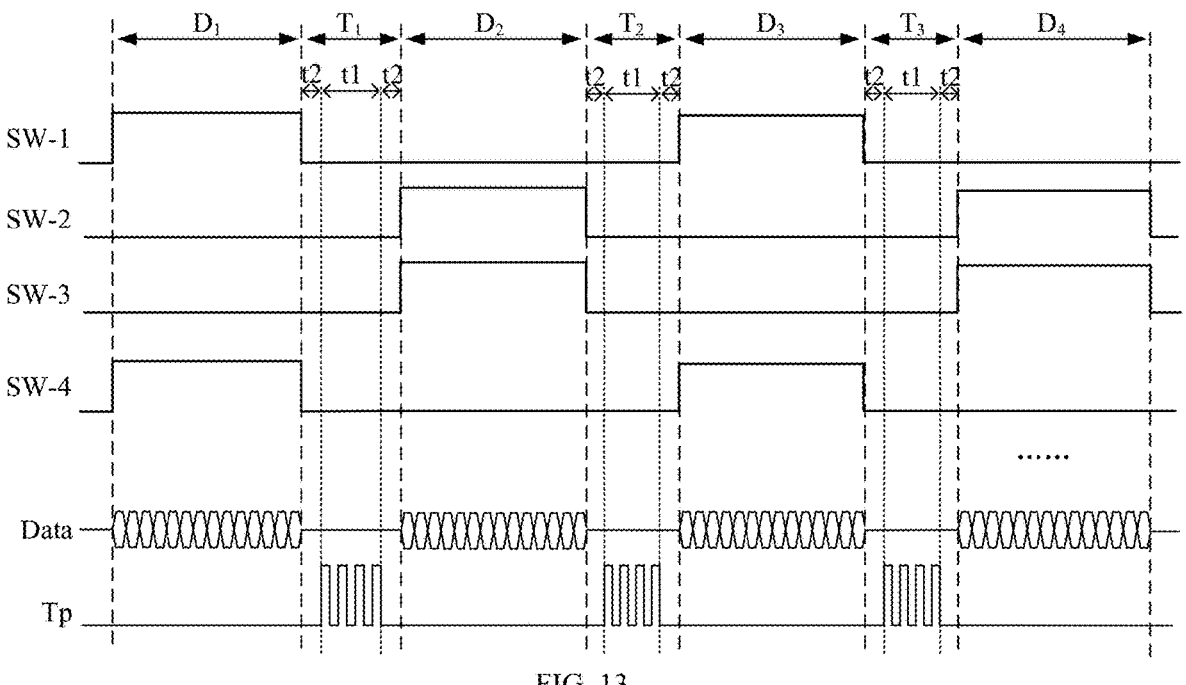
FIG. 13 is a timing diagram corresponding to FIG. 12.
Figure 14:
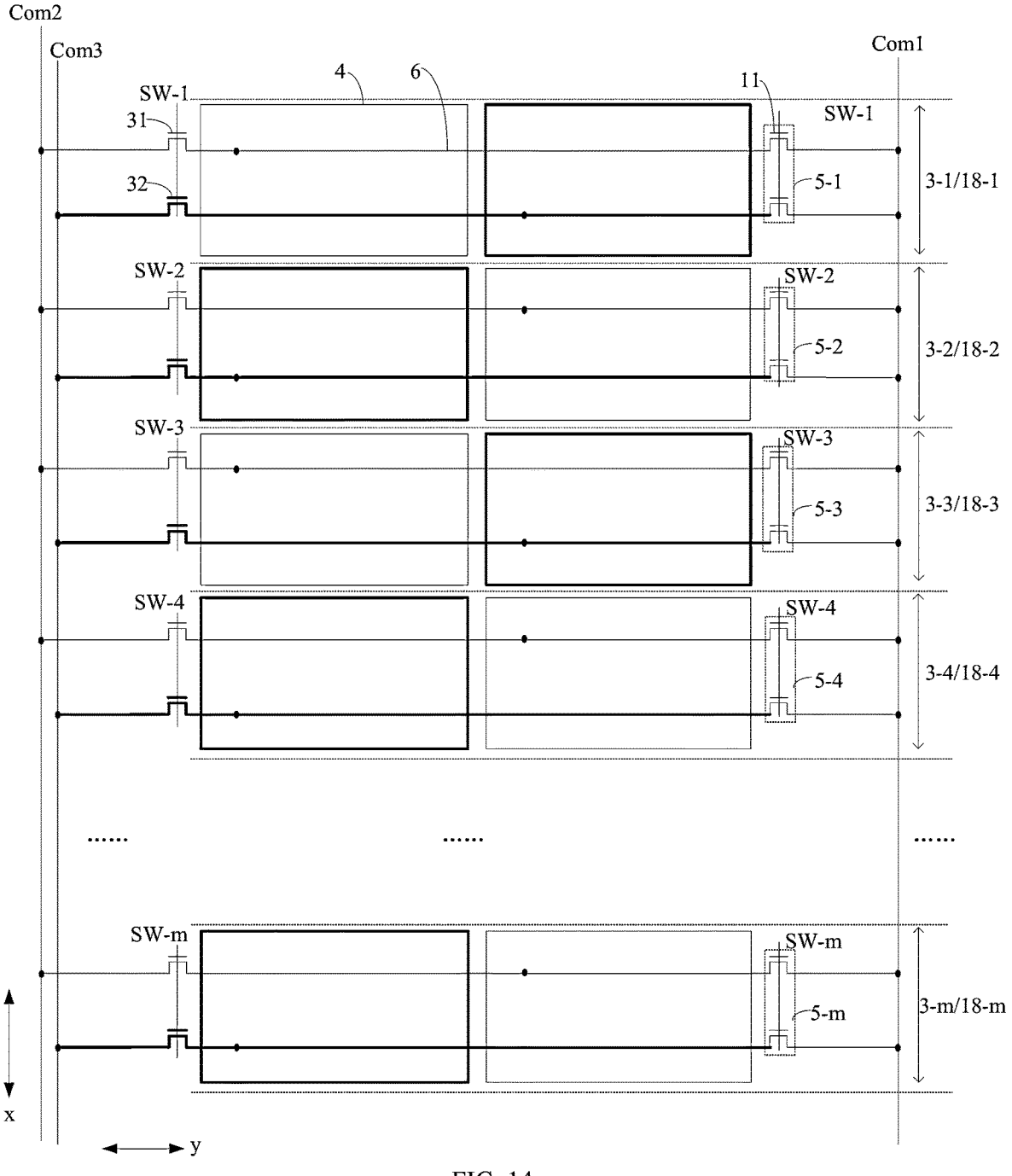
FIG. 14 is yet another schematic structural diagram of a display panel provided by an embodiment of the present disclosure.
Figure 15:
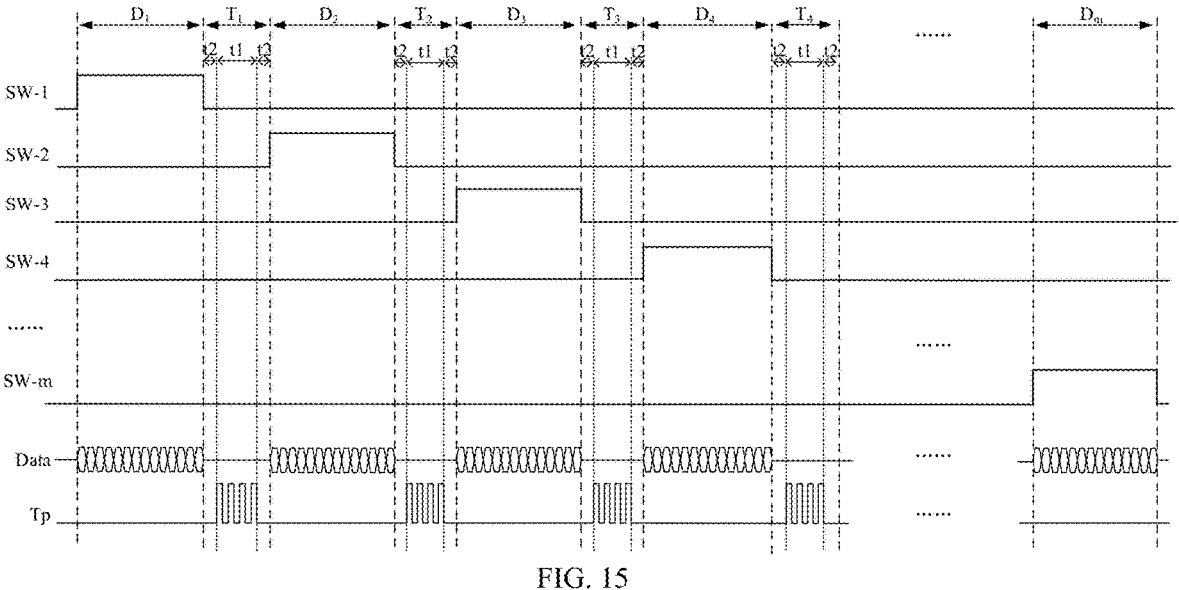
FIG. 15 is a timing diagram corresponding to FIG. 14.

In a feasible implementation, as shown in FIG. 12 to FIG. 15, FIG. 12 is yet another schematic structural diagram of a display panel provided by an embodiment of the present disclosure, FIG. 13 is a timing diagram corresponding to FIG. 12, FIG. 14 is yet another schematic structural diagram of a display panel provided by an embodiment of the present disclosure, and FIG. 15 is a timing diagram corresponding to FIG. 14. The input terminal of each first switch 11 is electrically connected to a first voltage signal line Com1 and the output terminal of each first switch 11 is electrically connected to a first end of a connecting line 6.

The display panel further includes second switches 31 and third switches 32. An input terminal of each second switch 31 is electrically connected to a second voltage signal line Com2 and an output terminal of each second switch 31 is electrically connected to a second end of a connecting line 6. An input terminal of each third switch 32 is electrically connected to a third voltage signal line Com3 and an output terminal of each third switch 32 is electrically connected to the second end of the connecting line 6.

The second switches 31 and the third switches 32 are electrically connected to different connecting lines 6. The touch electrodes 4 coupled to the second switches 31 and the touch electrodes 4 coupled to the third switches 32 are alternately arranged in both the first direction x and the second direction y. The second direction y intersects the first direction x.

Taking the structure shown in FIG. 12 as an example, in a column of touch electrodes 4, the touch electrodes 4 coupled to the second switches 31 and the touch electrodes 4 coupled to third switches 32 are alternately arranged. In a row of touch electrodes 4, the touch electrodes 4 coupled to the second switches 31 and the touch electrodes 4 coupled to the third switches 32 are also alternately arranged.

In this structure, the second switches 31 and the third switches 32 may be used for driving the display panel to display a test picture such as a checkerboard during a VT test.

During the VT test, the second voltage signal line Com2 provides a first test common voltage, the third voltage signal line Com3 provides a second test common voltage, and the first test common voltage is different from the second test common voltage. The second switches 31 and the third switches 32 are controlled to be turned on. The turned-on second switches 31 transmit the first test common voltage to the touch electrodes 4 connected thereto. The turned-on third switches 32 transmit the second test common voltage to the touch electrodes 4 connected thereto. Because the touch electrodes 4 coupled to the second switches 31 and the touch electrodes 4 coupled to the third switches 32 are alternately arranged in both the first direction x and the second direction y, the display panel can be controlled to display a checkerboard test picture.

In the process of the VT test, the first voltage signal line Com1 may not provide a voltage signal.

Further, for a first switch 11 and a second switch 31 connected to a same connecting line 6, a control terminal of the first switch 11 and a control terminal of the second switch 31 are connected to a same control signal line SW. For a first switch and a third switch 32 connected to a same connecting line 6, a control terminal of the first switch and a control terminal of the third switch 32 are connected to a same control signal line SW.

In addition, in the display stage D, the first voltage signal line Com1, the second voltage signal line Com2, and the third voltage signal line Com3 provide a same common voltage.

Taking the structure illustrated in FIG. 12 as an example, during the VT test of the display panel, the second voltage signal line Com2 provides the first test common voltage, the third voltage signal line Com3 provides the second test common voltage, and the first test common voltage is different from the second test common voltage. The control signal line SW-1, the control signal line SW-2, the control signal line SW-3, and the control signal line SW-4 provide a conduction level. The second voltage signal line Com2 provides the first test common voltage, and the turned-on second switches 31 transmit the first test common voltage to the touch electrodes 4 connected thereto. The turned-on third switches 32 transmit the second test common voltage to the touch electrodes 4 connected thereto. In this process, the first voltage signal line Com1 may not provide a voltage signal.

However, in a display process of the display panel, the first voltage signal line Com1, the second voltage signal line Com2, and the third voltage signal line Com3 may provide a same common voltage for display.

Taking the structure illustrated in FIG. 12 as an example, in conjunction with FIG. 13, in the display stage $D_1$ and the display stage $D_3$, the control signal line SW-1 and the control signal line SW-4 provide a conduction level. The turned-on first switches 11 write the common voltage provided by the first voltage signal line Com1 into the touch electrodes 4 in the first touch subregions 7. The turned-on second switches 31 write the common voltage provided by the second voltage signal line Com2 into the touch electrodes 4 in the first touch subregions 7. The turned-on third switches 32 write the common voltage provided by the third voltage signal line Com3 into the touch electrodes 4 in the first touch subregions 7. In this way, it is possible for the touch electrodes 4 in the first touch subregions 7 to simultaneously receive the common voltage from both ends of the connecting lines 6, which is conductive to improving signal uniformity.

In the display stage $D_2$ and the display stage $D_4$, the control signal line SW-2 and the control signal line SW-3 provide a conduction level. The turned-on first switches 11 write the common voltage provided by the first voltage signal line Com1 into the touch electrodes 4 in the second touch subregions 8. The turned-on second switches 31 write the common voltage provided by the second voltage signal line Com2 into the touch electrodes 4 in the second touch subregions 8. The turned-on third switches 32 write the common voltage provided by the third voltage signal line Com3 into the touch electrodes 4 in the second touch subregions 8. In this way, it is also possible for the touch electrodes 4 in the second touch subregions 8 to simultaneously receive the common voltage from both ends of the connecting lines 6, which is conductive to improving signal uniformity.

Figure 16:
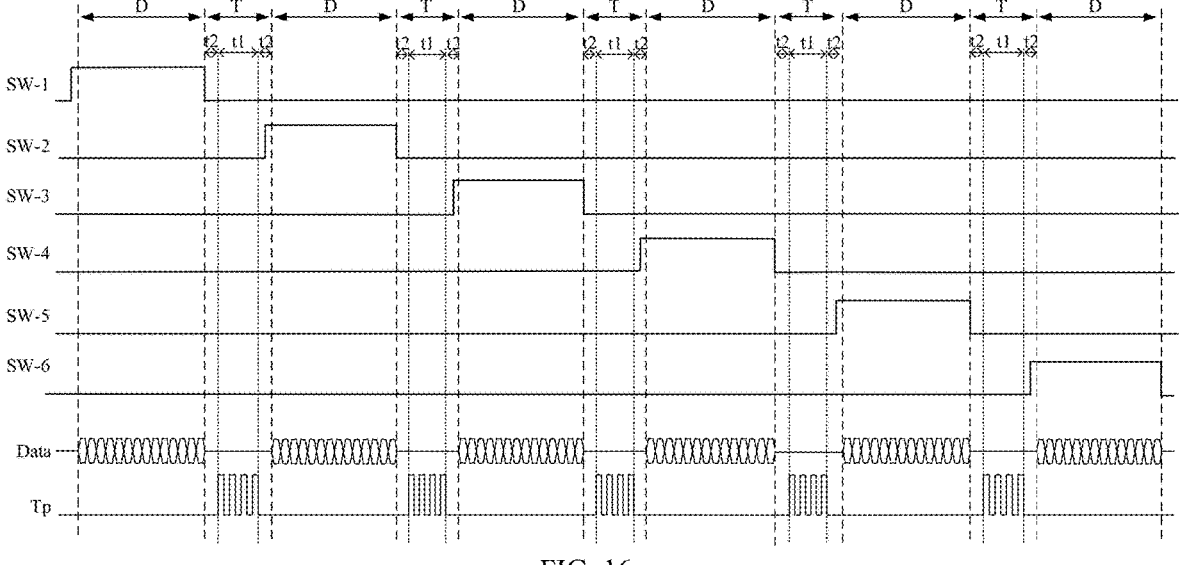
FIG. 16 is another timing diagram corresponding to FIG. 6.

In a feasible implementation, as shown in FIG. 16, which is another timing diagram corresponding to FIG. 6, an operation starting moment of the control unit 5 falls within the blank time period t2 before the display stage D during which the control unit 5 operates.

In this arrangement, before entering the display stage D, the control unit 5 is driven to operate to charge the touch electrodes 4. In this way, it is possible to increase a recovery time of a voltage signal on each touch electrode 4, such that the touch electrode 4 has been charged to a stable common voltage or a nearly stable common voltage when the display stage D starts. Since the stable common voltage signal is less disturbed by the voltage jumps on the data lines, it can be more greatly ensured that the voltage signals on the touch electrodes 4 are a stable common voltage when entering the display stage D from the touch stage T, thereby alleviating the phenomenon of horizontal stripes more effectively.

Further, referring to FIG. 16 again, to avoid mutual interference of the signals transmitted onto the touch electrodes 4 within the effective touch time period t1 and the blank time period t2, and to improve touch reliability and display reliability, a time interval may be provided between the operation starting moment of the control unit 5 and the effective touch time period t1.

Based on the same inventive concept, an embodiment of the present disclosure further provides a drive method for a display panel. In conjunction with FIG. 3 to FIG. 5, the display panel includes a plurality of display subregions 1 arranged along a first direction x. Each display subregion 1 includes a plurality of pixel electrodes 2. The display panel further includes at least two touch subregions 3 arranged along the first direction x. Each touch subregion 3 includes a plurality of touch electrodes 4. Each touch electrode 4 is electrically connected to a touch signal line Tp. One touch subregion 3 overlaps at least one display subregion 1. The display panel further includes at least two control units 5. One control unit 5 is electrically connected to the touch electrodes 4 in at least one touch subregion 3 through connecting lines 6. The control unit 5 is configured to transmit a common voltage to the touch electrodes 4 connected thereto during operation.

A one-frame drive cycle of the display panel includes alternating display stages D and touch stages T. The touch stage T includes an effective touch time period t1 and a blank time period t2. One display stage D corresponds to one display subregion 1.

The drive method includes: in the display stage D, writing data voltages into the pixel electrodes 2 in a corresponding display subregion 1, and causing a portion of the control units 5 to operate to transmit a common voltage to the touch electrodes 4 in a portion of the touch subregions 3, where the touch subregion 3 that receives the common voltage overlaps the display subregion 1 into which the data voltages are written; and in the effective touch time period t1, causing none of the control units 5 to operate, and sensing, by each touch electrode 4, a touch signal and transmitting, by the each touch electrode 4, the touch signal to the touch signal line Tp.

Based on the above analysis, in this embodiment of the present disclosure, at least two control units 5 are provided, such that the operating states of the at least two control units 5 can be individually controlled. For example, in the display stage D, only one control unit 5 needs to be controlled to operate, without changing the states of other control units 5, and thus the power consumption of the panel can be reduced effectively.

In addition, when entering the display stage D from the touch stage T, because only a portion of the control units 5 operate to write the common voltage into a portion of the touch electrodes 4, not only the waste of power consumption can be reduced, but also the coupling between the touch electrodes 4 and the data lines can be weakened by the voltage jumps occurring in only a portion of the touch electrodes 4 compared with the case where the voltage jumps occur in all the touch electrodes 4 of an entire screen, which in turn reduces loads of the data lines. On the one hand, the charging and discharging of the data lines are accelerated. On the other hand, the degree of the disturbance of the voltages on the touch electrodes 4 by the voltage jumps on the data lines is alleviated when the touch electrodes 4 are charged, enabling the voltages on the touch electrodes 4 to be charged to a standard common voltage value more quickly to effectively alleviate the phenomenon of pits and horizontal stripes.

In a feasible implementation, referring to FIG. 16, an operation starting moment of the control unit 5 falls within the blank time period t2 before the display stage D during which the control unit 5 operates.

In this arrangement, before entering the display stage D, the control unit 5 is driven to operate to charge the touch electrodes 4. In this way, it is possible to increase a recovery time of a voltage signal on each touch electrode 4, such that the touch electrode 4 has been charged to a stable common voltage or a nearly stable common voltage when the display stage D starts. Since the stable common voltage signal is less disturbed by the voltage jumps on the data lines, it can be more greatly ensured that the voltage signals on the touch electrodes 4 are a stable common voltage when entering the display stage D from the touch stage T, thereby alleviating the phenomenon of horizontal stripes more effectively.

Further, referring to FIG. 16, to avoid mutual interference of the signals transmitted onto the touch electrodes 4 within the effective touch time period t1 and the blank time period t2, and to improve touch reliability and display reliability, a time interval may be provided between the operation starting moment of the control unit 5 and the effective touch time period t1.

Figures 17, 18:
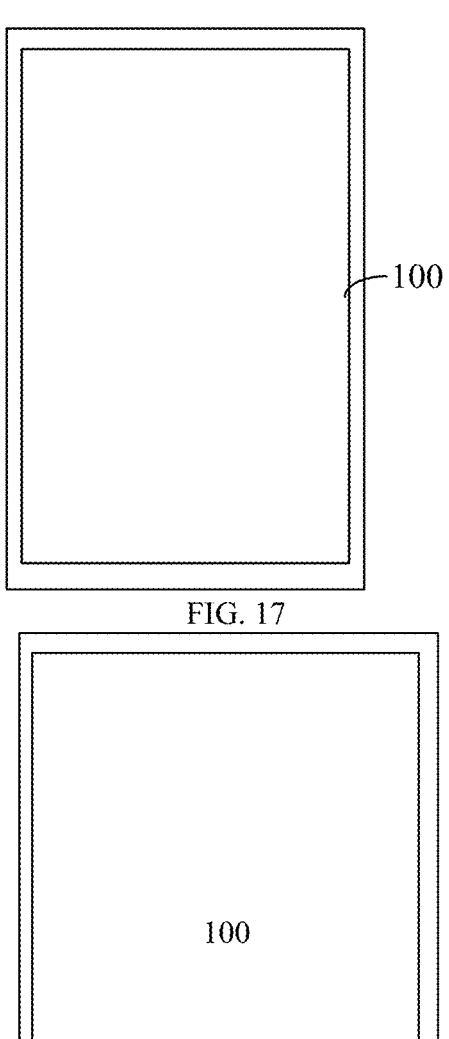
FIG. 17 is a schematic structural diagram of a display device provided by an embodiment of the present disclosure.
FIG. 18 is another schematic structural diagram of a display device provided by an embodiment of the present disclosure.

Based on the same inventive concept, an embodiment of the present disclosure further provides a display device, as shown in FIG. 17, FIG. 17 is a schematic structural diagram of a display device provided by an embodiment of the present disclosure. The display device includes the above-mentioned display panel 100. The specific structure of the display panel 100 has been described in detail in the above-mentioned embodiments, and is not described herein again. Certainly, the display device shown in FIG. 17 is for schematic description only, and the display device may be any electronic device with a display function, such as a mobile phone, a tablet computer, a notebook computer, an ebook, or a television.

Figure 19:
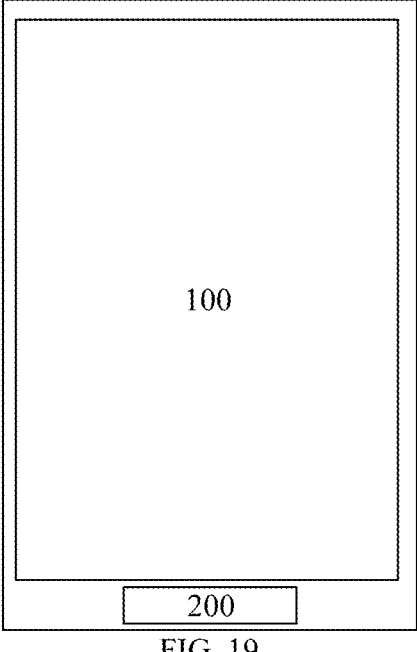
FIG. 19 is still another schematic structural diagram of a display device provided by an embodiment of the present disclosure.

Further, as shown in FIG. 18 and FIG. 19, FIG. 18 is another schematic structural diagram of a display device provided by an embodiment of the present disclosure, and FIG. 19 is still another schematic structural diagram of a display device provided by an embodiment of the present disclosure. The display device further includes a timing controller 200. The timing controller 200 is configured to provide a control signal for driving the control unit 5 to operate.

The timing controller 200 is usually provided with an I/O port capable of outputting high/low level timings, such that a control signal line SW electrically connected to the control unit 5 can be electrically connected to the timing controller 200, to provide, by using the timing controller 200, the control signal for driving the control unit 5 to operate.

In the embodiment of the present disclosure, referring to FIG. 18, the display device further includes a printed circuit board (PCB) 300 and a flexible printed circuit (FPC) 400. The PCB 300 is electrically connected to the display panel 100 through the FPC 400. The timing controller 200 may be integrated on the PCB 300. The timing controller 200 is led to the FPC 500 through PCB 400 cabling, and is in turn electrically connected to the control unit 5 through the control signal line SW in the panel. Alternatively, referring to FIG. 19, the timing controller 200 may be integrated on the display panel 100. In this structure, the timing controller 200 is electrically connected to the control unit 5 directly through the control signal line SW in the panel.

The above descriptions are merely preferred embodiments of the present disclosure and are not intended to limit the present disclosure. Any modification, equivalent replacement and improvement within the spirit and principle of the present disclosure shall be comprised within the protection scope of the present disclosure.

Finally, it should be noted that the foregoing embodiments are merely intended to describe and not to limit the technical solutions of the present disclosure. Although the present disclosure has been described in detail with reference to the foregoing embodiments, those skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions in the various embodiments of the present disclosure.

What is claimed is:

1. A display panel, comprising:

a plurality of display subregions arranged along a first direction, wherein each display subregion comprises a plurality of pixel electrodes;

at least two touch subregions arranged along the first direction, wherein each touch subregion comprises a plurality of touch electrodes, each touch electrode is electrically connected to a touch signal line, and one touch subregion overlaps at least one display subregion; and at least two control units, wherein one control unit is electrically connected to the touch electrodes in at least one touch subregion through connecting lines, and the control unit is configured to transmit a common voltage to the touch electrodes connected to the control unit during operation, wherein the touch subregions comprise a plurality of first touch subregions and a plurality of second touch subregions, and the first touch subregions and the second touch subregions are alternately arranged; and the control units comprise a first control unit and a second control unit, the first control unit is electrically connected to the touch electrodes in the plurality of first touch subregions, and the second control unit is electrically connected to the touch electrodes in the plurality of second touch subregions, and wherein a one-frame drive cycle of the display panel comprises alternating display stages and touch stages, each touch stage comprises an effective touch time period and a blank time period, and one display stage corresponds to one display subregion;

in the display stage, data voltages are written into the pixel electrodes in a corresponding display subregion, a portion of the control units operate to transmit the common voltage to the touch electrodes in a portion of the touch subregions, and the touch subregion into which the common voltage is written overlaps the display subregion into which the data voltages are written; and in the effective touch time period, none of the control units operate, and each of the touch electrodes senses a touch signal and transmits the touch signal to the touch signal line.

2. The display panel according to claim 1, wherein a number of the touch subregions is equal to a number of the display subregions, and one touch subregion overlaps one display subregion.

3. The display panel according to claim 1, wherein the connecting lines extend along the first direction, and the control units are located on at least one side of the connecting lines in the first direction.

4. The display panel according to claim 1, wherein the connecting lines extend along a second direction, the control units are located on at least one side of the connecting lines in the second direction, and the second direction intersects the first direction.

5. The display panel according to claim 1, wherein in a same touch subregion, the touch electrodes arranged in a direction in which the connecting lines extend are electrically connected to one connecting line.

6. The display panel according to claim 1, wherein the control unit comprises a plurality of first switches, each first switch is electrically connected to the touch electrode through one connecting line of the connecting lines, and in the display stage, the first switches in a portion of the control units are turned on in response to a control signal, to transmit the common voltage to the touch electrodes connected to the first switches.

7. The display panel according to claim 6, wherein each connecting line has a first end and a second end each electrically connected to one first switch, and the first switches electrically connected to a same connecting line receive a same control signal in the display stage and receive a same control signal in the touch stage.

8. The display panel according to claim 6, wherein each first switch has an input terminal electrically connected to a first voltage signal line and an output terminal electrically connected to a first end of one connecting line of the connecting lines; and the display panel further comprises second switches and third switches, each second switch includes an input terminal electrically connected to a second voltage signal line and an output terminal electrically connected to a second end of one connecting line of the connecting lines, and each third switch includes an input terminal electrically connected to a third voltage signal line and an output terminal electrically connected to a second end of one connecting line of the connecting lines;

wherein the third switches and the second switches are electrically connected to different connecting lines, the touch electrodes coupled to the second switches and the touch electrodes coupled to the third switches are alternately arranged in both the first direction and a second direction, and the second direction intersects the first direction.

9. The display panel according to claim 8, wherein for the first switch and the second switch connected to a same connecting line, a control terminal of the first switch and a control terminal of the second switch are connected to a same control signal line;

for the first switch and the third switch connected to a same connecting line, a control terminal of the first switch and a control terminal of the third switch are connected to a same control signal line; and in the display stage, the first voltage signal line, the second voltage signal line, and the third voltage signal line provide a same common voltage.

10. The display panel according to claim 1, wherein an operation starting moment of the control unit falls within the blank time period before the display stage during which the control unit operates.

11. The display panel according to claim 10, wherein a time interval is provided between the operation starting moment of the control unit and the effective touch time period.

12. A drive method for a display panel, wherein the display panel comprises:

a plurality of display subregions arranged along a first direction, wherein each display subregion comprises a plurality of pixel electrodes;

at least two touch subregions arranged along the first direction, wherein each touch subregion comprises a plurality of touch electrodes, each touch electrode is electrically connected to a touch signal line, and one touch subregion overlaps at least one display subregion; and at least two control units, wherein one control unit is electrically connected to the touch electrodes in at least one touch subregion through connecting lines, and the control unit is configured to transmit a common voltage to the touch electrodes connected to the control unit during operation, wherein the touch subregions comprise a plurality of first touch subregions and a plurality of second touch subregions, and the first touch subregions and the second touch subregions are alternately arranged; and the control units comprise a first control unit and a second control unit, the first control unit is electrically connected to the touch electrodes in the plurality of first touch subregions, and the second control unit is electrically connected to the touch electrodes in the plurality of second touch subregions, and wherein a one-frame drive cycle of the display panel comprises alternating display stages and touch stages, each touch stage comprises an effective touch time period and a blank time period, and one display stage corresponds to one display subregion;

the drive method comprises:

in the display stage, writing data voltages into the pixel electrodes in a corresponding display subregion, and causing a portion of the control units to operate to transmit the common voltage to the touch electrodes in a portion of the touch subregions, wherein the touch subregion that receives the common voltage overlaps the display subregion into which the data voltages are written; and in the effective touch time period, causing none of the control units to operate, and sensing, by each of the touch electrodes, a touch signal and transmitting, by the each of the touch electrodes, the touch signal to the touch signal line.

13. The drive method according to claim 12, wherein an operation starting moment of the control unit falls within the blank time period before the display stage during which the control unit operates.

14. The drive method according to claim 13, wherein a time interval is provided between the operation starting moment of the control unit and the effective touch time period.

15. A display device, comprising a display panel, wherein the display panel comprises:

a plurality of display subregions arranged along a first direction, wherein each display subregion comprises a plurality of pixel electrodes;

at least two touch subregions arranged along the first direction, wherein each touch subregion comprises a plurality of touch electrodes, each touch electrode is electrically connected to a touch signal line, and one touch subregion overlaps at least one display subregion; and at least two control units, wherein one control unit is electrically connected to the touch electrodes in at least one touch subregion through connecting lines, and the control unit is configured to transmit a common voltage to the touch electrodes connected to the control unit during operation, wherein the touch subregions comprise a plurality of first touch subregions and a plurality of second touch subregions, and the first touch subregions and the second touch subregions are alternately arranged; and the control units comprise a first control unit and a second control unit, the first control unit is electrically connected to the touch electrodes in the plurality of first touch subregions, and the second control unit is electrically connected to the touch electrodes in the plurality of second touch subregions, and wherein a one-frame drive cycle of the display panel comprises alternating display stages and touch stages, each touch stage comprises an effective touch time period and a blank time period, and one display stage corresponds to one display subregion;

in the display stage, data voltages are written into the pixel electrodes in a corresponding display subregion, a portion of the control units operate to transmit the common voltage to the touch electrodes in a portion of the touch subregions, and the touch subregion into which the common voltage is written overlaps the display subregion into which the data voltages are written; and in the effective touch time period, none of the control units operate, and each of the touch electrodes senses a touch signal and transmits the touch signal to the touch signal line.

16. The display device according to claim 15, wherein the display device further comprises a timing controller, the timing controller is configured to provide a control signal for driving the control units to operate.

\* \* \* \* \*